H. J. DANIELS.
MACHINE FOR HARVESTING POTATOES AND LIKE ROOT CROPS.
APPLICATION FILED APR. 6, 1915.
1,195,563.
Patented Aug. 22, 1916.
2 SHEETS—SHEET 1.
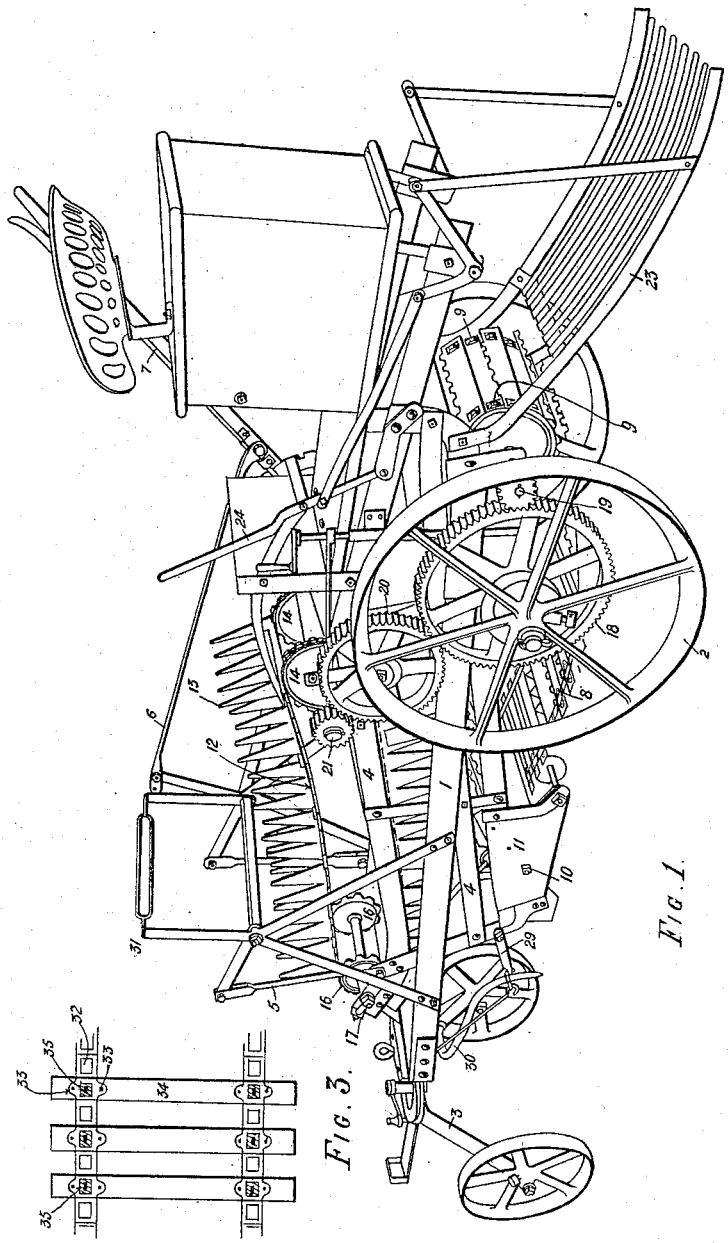
Inventor
Henry John Daniels
By
M. Wallace White
Attorney H. J. DANIELS.
MACHINE FOR HARVESTING POTATOES AND LIKE ROOT CROPS.
APPLICATION FILED APR. 6, 1915.
1,195,563.
Patented Aug. 22, 1916.
2 SHEETS—SHEET 2.
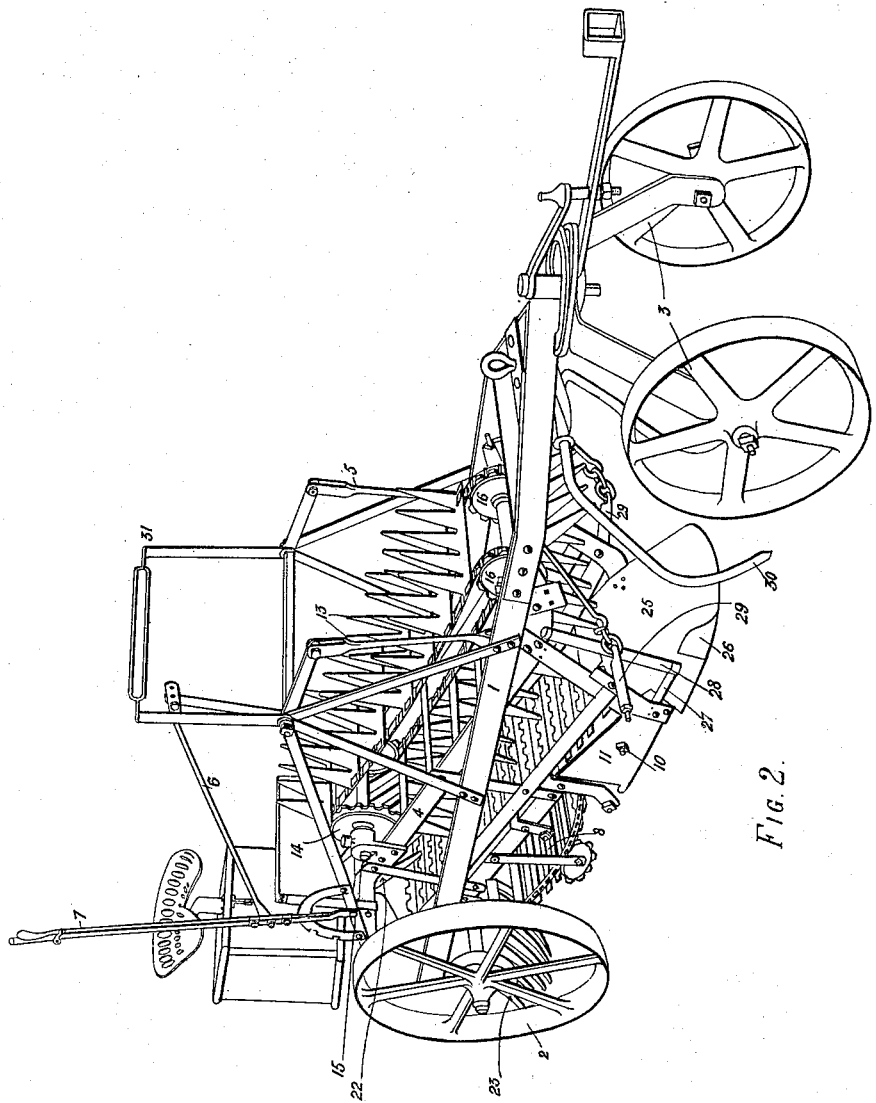

UNITED STATES PATENT OFFICE.

HENRY JOHN DANIELS, OF BRISBANE, QUEENSLAND, AUSTRALIA.

MACHINE FOR HARVESTING POTATOES AND LIKE ROOT CROPS.

1,195,563.  Specification of Letters Patent.  Patented Aug. 22, 1916.

Application filed April 6, 1915. Serial No. 19,512.

*To all whom it may concern:*

Be it known that I, HENRY JOHN DANIELS, a subject of the King of Great Britain, residing at Zoeller's Buildings, Queen street, Brisbane, in the State of Queensland, Commonwealth of Australia, and late of 86 Victoria avenue, Albert Park, Victoria, in the said Commonwealth, farmer, have invented certain new and useful Improvements in Machines for Harvesting Potatoes and the like Root Crops, of which the following is a specification.

This invention relates to improvements in potato harvesting machines and is supplementary to my Patent No. 1,033,675 patented to me on 23rd day of July 1912, the object of which is to insure greater efficiency in work and to reduce the cost of manufacture.

The invention consists in an iron frame supported upon an axle and rear traveling wheels and fore carriage, the latter connected to an extension frame from main frame by a king bolt; the fore carriage is supported by a pair of front steering wheels and is provided with a draft pole for horse traction. Within the frame is a cradle pivotally mounted upon the traveling wheels' axle, and suspended in front by a cranked bridge piece. This cradle is free to oscillate vertically between the sides of the frame and is operated by a hand lever.

On to the traveling wheels' axle on one side of the machine between the traveling wheel and the frame is keyed a cog wheel which gears with a cog pinion and clutch adapted to slide upon the axle carrying the back sprocket wheels of the potato carrier. This cog wheel also gears with a smaller cog wheel revolving upon an axle bracket bolted to the side of the cradle, which in turn gears with a cog pinion and clutch adapted to slide upon and gear with the axle carrying the rear sprocket wheels of the weed carrier.

Mounted upon the rear of the cradle are two sprocket wheels one at each side, over which travel the potato carrier, consisting of sprocket chains with toothed bars fixed thereon at equal distances apart and to the front end of the cradle are fixed side plates or cheeks carrying small sprocket wheels over which the sprocket chains work. These plates are supported in front by bars and chains connected to the main frame.

On to the top side bars of the cradle at the rear are a pair of sprocket wheels keyed to an axle revolving in bearings and connected by sprocket chains to a pair of sprocket wheels revolving upon an axle supported by adjustable brackets on the side bars at the front end of the cradle. To the sprocket chains are fixed combs, for carrying the weeds to the rear of the machine from which they are discharged on to the ground. Fixed to the machine at the rear of the comb traveler is a fork for breaking up and freeing the weeds from the combs.

Means are provided for raising and lowering the potato carrier, putting same in and out of gear and also for putting comb carrier in and out of gear.

Although the principle of the invention is the same as in my previous invention the general construction has been considerably modified, by placing the driver's seat and lever for raising and lowering the cradle at the rear of the machine, by dispensing with the side plates or colters, the plurality of rollers and the guard rails of the cradle: also by the addition of a weed rake, means for preventing clogging of the potato carrier, placing the whole of the gearing for operating both the potato carrier and the weed carrier on one side of the machine, and by altering the position of the adjusting bar or flexible member by attaching same to the lower portion of the cradle near the side cheeks, so that the pull is taken from the point of greatest resistance.

To fully describe the invention, reference is now made to the drawings in which:—

Figure 1, is a perspective side view looking from the back with cradle in raised position. Fig. 2, is a perspective side view looking from the front with cradle lowered ready to start work. Fig. 3, detail of bearers of potato carrier.

The same reference numerals are used to indicate like parts in all figures.

The main frame (1) is supported on traveling wheels and axle (2) at the rear and on steering wheels and fore carriage (3) in front. Within the frame is a cradle (4) pivotally mounted upon the axle of the traveling wheels and suspended in front by rods (5) connected by a rod (6) to a raising and lowering lever (7) by which it is raised or lowered as required.

(8) is a potato carrier for conveying the potatoes as dug out of the ground, from the front to the back of the machine: this carrier travels over sprocket wheels (9)

mounted upon an axle at the rear of the machine and upon sprocket wheels mounted upon an axle (10) between the cheeks (11).

A weed carrier (12) provided with fingers or combs (13) travels over sprocket wheels (14) keyed to an axle revolving in bearings (15) bolted to the top bar of the cradle (8) at the rear end, and over sprocket wheels (16) revolving between collars upon axle secured to adjustable brackets (17) bolted to the top bar of the cradle (8) at the front end.

(18) is a cog wheel keyed on to the main axle gearing with a cog pinion (19) provided with a clutch adapted to slide upon the axle carrying the sprocket wheels of the potato carrier, by which the same is thrown in and out of action: the cog wheel (18) also gears with a cog wheel (20) which in turn gears with a cog pinion (21) provided with a clutch adapted to slide upon the axle carrying the sprocket wheels (14) and by which the weed carrier is thrown in and out of action.

(22) are a number of knives arranged in a row between which the combs (13) pass and which cut into pieces any weeds that may cling to the combs and so free them.

(23) is a screen upon which the potatoes fall from the machine and which is raised or lowered as required by the lever (24).

(27) is a bracket for carrying a roller (28) and (25) a digging share with a wing (26) for protecting the joint of the roller and bracket.

(29) is the flexible draft member attached as shown to near the bottom of the front end of the cradle.

(30) is a heavy rake pivotally connected to the underside of the frame for dragging and tearing away the weeds.

(31) a support for the reins.

In detail in Fig. 3, (32) is the sprocket chain on which are lugs (33) for riveting same on to bearers (34), in which are cut holes (35) larger than the teeth of the sprocket chain, preventing any clogging of earth between the bearers and the sprocket chains, thus avoiding the possibility of the chains slipping off the sprocket wheels.

Although the improvements may appear trivial they are essential features for the perfecting of the machine to insure successful working, and the modification in the general construction provides a better balance and cheapens production.

What I do claim as my invention, and desire to secure by Letters Patent is:—

1. In a potato harvesting machine, a cradle, a digging share associated with the cradle, a vertically disposed roller journaled in bearings on the cradle, and a protecting wing provided on the digging share in advance of one of the bearings of the roller.

2. A potato harvesting machine comprising a portable frame, a cradle mounted in the frame, a digging share associated with the cradle, a potato conveyer carried by the cradle and leading from the digging share, a traveling weed carrier arranged coextensive with the said conveyer and having combs traversing the latter, cutting knives supported by the frame and operatively associated with the combs of the weed carrier to cut the weeds carried thereby, and means for operating the said conveyer and carrier.

3. A potato harvesting machine comprising a portable frame, a cradle mounted in the frame, a digging share associated with the cradle, a potato conveyer carried by the cradle and leading from the digging share, a raking device disposed in front of the digging share, a traveling weed carrier arranged coextensive with the said conveyer and having combs traversing the latter, cutting knives supported by the frame and operatively associated with the combs of the weed carrier to cut the weeds carried thereby, and means for operating the said conveyer and carrier.

In testimony whereof, I have affixed my signature, in presence of two witnesses.

HENRY JOHN DANIELS.

Witnesses:
E. GARLAND ABELL,
OLIVE K. ABELL.

Copies of this patent may be obtained for five cents each, by addressing the "Commissioner of Patents, Washington, D. C."